INVENTOR

Leonard B. Lipson

Patented Feb. 22, 1949

2,462,270

UNITED STATES PATENT OFFICE 2,462,270

METHOD AND APPARATUS FOR PHYSICO-CHEMICAL ANALYSIS

Leonard B. Lipson, Arlington County, Va.

Application September 7, 1943, Serial No. 501,499

7 Claims. (Cl. 250—83.6)

This invention relates in general to certain new and useful improvements in methods and apparatus for physico-chemical analysis and more particularly for the determination of hydrogenous materials in soil samples and the like.

Soil and similar substances containing minute quantities of hydrogenous materials cannot be accurately analysed by ordinary schemes of chemical analysis in the absence of time-consuming attenuated procedures. It has been experimentally established, however, that materials which contain hydrogenous substances produce measurable nuclear reactions when bombarded by neutrons. Neutron particles are not decelerated or otherwise materially affected by heavy inorganic molecules but even minute amounts of hydrogen atoms, however combined or chemically associated, will slow down the neutron particles. The number of such slow neutrons bears a statistically direct ratio to the amount of hydrogenous material present. Thus by bombarding a sample with fast neutrons and measuring the quantity of slow neutrons resulting from inelastic collision with hydrogen nuclei it is possible to determine within desirable limits of precision, the amount of hydrogenous material present. Such analytical procedure has been found to be entirely reliable and definitive as well as being exceedingly rapid, simple, and efficient.

It is therefore a principal object of the present invention to provide a simple rapid and definitive method for the analytical determination of hydrogenous substances and apparatus for carrying out the same.

It is also an object of the present invention to provide compact and economical apparatus for bombarding a sample containing hydrogenous material with fast neutrons and measuring the resultant quantity of slow neutrons. In the drawings (one sheet)

Figure 1:
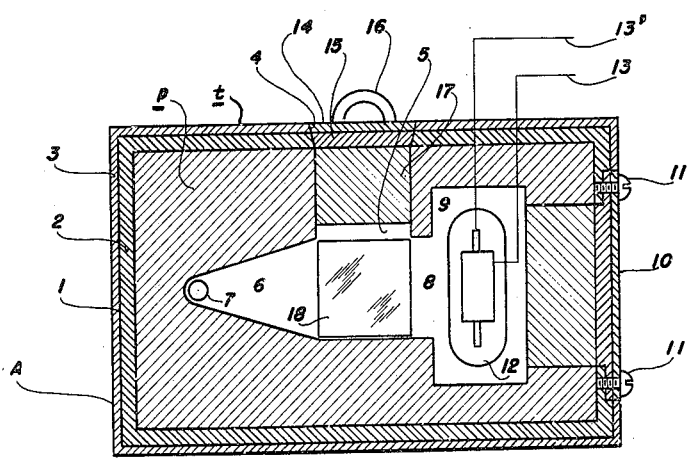
Figure 1 is a lengthwise sectional view of a chamber for bombarding a sample with fast neutrons and detecting the resultant quantity of slow neutrons.

Referring now in more detail and by reference characters to the drawings, A designates a neutron bombardment chamber comprising a preferably rectilinear box 1 having walls formed of an inner relatively thick wooden ply or layer 2 and an outer ply or layer 3 of cadmium foil, cadmium plated metal, or other radiation absorbing material, the top wall $t$ being centrally provided with aperture 4. Interiorly the box 1 is substantially filled with paraffin wax $p$ recessed to provide a central rectangular sample well 5 extending upwardly and opening to the aperture 4. The relation between external size of the chamber A and the size of the sample well 5, is such that there will be a substantially thick mass of paraffin surrounding the sample well 5, and consequently practically all of the neutrons which would otherwise escape from the chamber are absorbed. The few highly energized neutrons which succeed in passing through the paraffin are, of course, absorbed in the cadmium foil layer 3.

Extending laterally from one of the vertical walls of the sample well 5 is a tapered recess 6 provided at its apex with a preferably brass capsule 7 containing a beryllium-polonium mixture or other suitable material constituting a source of fast neutrons. Extending laterally from the opposite wall of the sample well 5 is a short connecting passage or channel 8 preferably having the same cross sectional shape and area as the opening of the tapered recess 6, and communicating with a somewhat larger compartment 9, one of the side walls of which is provided with a relatively large removable section 10 held in position by means of screws 11 or other suitable fastening elements.

Suitably mounted within the compartment 9 is a neutron counter tube 12 having suitable leads 13, 13' extending through the walls of the box 1. For this purpose I employ a self-extinguishing tube of the Geiger-Mueller type suitably charged with a nuclear reactant, that is to say, a substance containing atoms of low atomic number capable of emitting alpha particles of relatively high energy when bombarded by neutrons. I have found that boron trifluoride is a preferable type of nuclear reactant.

Shaped for snug fitting disposition within the upper portion of the sample well 5 is a closure plug 14 consisting of a two-ply wood-cadmium member 15 matching the wall in thickness and materials and provided at its outer face with a semi-circular handle 16. On its under face the member 15 is provided with a paraffin wax plug 17 having a length sufficient to extend down through the sample well 5 almost to the level of the upper margins of the tapered recess 6 and the channel 8. Sized for removable disposition within the sample well 5 is a rectilinear sample container 18 formed preferably of brass or other suitable neutron-transparent material, all as best seen in Figure 1.

The lead 13 issuing from the chamber A is connected to one input lead of a high-gain linear amplifier B and to ground. The lead 13' is connected through the resistor 19 to a source of high voltage and is also connected through the capacitor 20 to the other input lead of the linear amplifier B. This source of high voltage is maintained below the threshold voltage of the counter tube 12 so that such tube 12 will count only neutrons and will not be affected by extraneous radiations such as cosmic rays, gamma rays and the like. The output leads of the linear amplifier B are connected to the input leads of the multi-vibrator C and the output leads of the latter are in turn connected to an electro-mechanical recorder D preferably of the recording type, all as shown in Figure 2.

Figure 2:
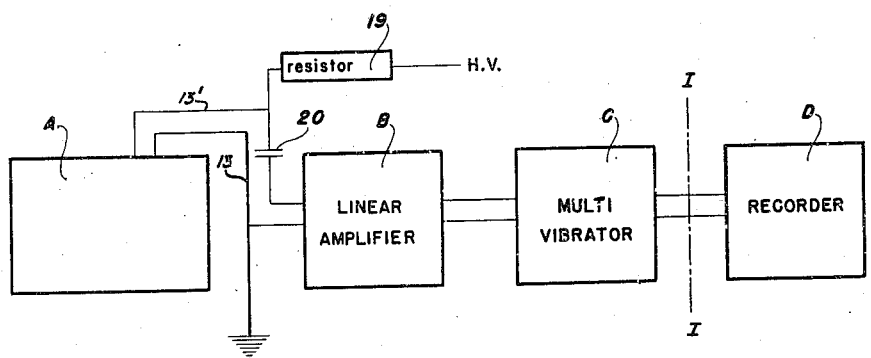
Figure 2 is a diagrammatic representation of a preferred form of apparatus for the analytical determination of hydrogenous substances in accordance with the method of the present invention.
Figure 3:
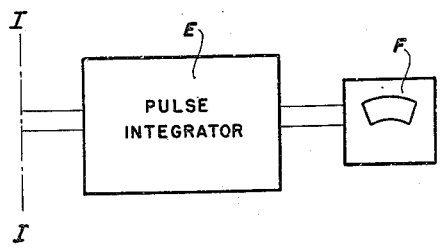
Figure 3 is a diagrammatic representation of an alternative form of indicating mechanism associated with and forming part of my present invention.

If desired an instantaneous recording system may be employed by substituting, along the line I—I, in the circuit shown in Figure 2, a pulse integrator E and any suitable type of direct reading instantaneous recorder F connected as shown diagrammatically in Figure 3.

In performing an analysis a sample of soil or other material containing hydrogenous substances is carefully mulled or ground to a substantially uniform state of fineness and dried under carefully controlled moderate temperature so as to remove all traces of moisture. It is essential that the sample be thoroughly dried inasmuch as water is itself an hydrogenous substance and would introduce substantial errors into the analytical result. Either before or after drying the sample is packed firmly but not tightly into the sample container 18. Because of the danger of contaminating the sample with water vapor picked up from the atmosphere, it is preferable that the sample be packed into the container 18 prior to drying. When dry the sample is weighed and then placed within the sample well 5.

The stream of fast neutrons issuing from the neutron source 7 will pass through the sample and, depending upon the presence of hydrogenous material, a certain number of the neutrons will be slowed down and the composite stream of fast and slow neutrons will pass through the channel 8 into the compartment 9. The neutrons will register upon the counter tube 12 and create impulses which will pass through the linear amplifier B, the multi-vibrator C and be recorded by the recorder D. It is of course obvious that where the instantaneous recording system shown in Figure 3 is used the impulses from the counter will be visually noted rather than permanently recorded. By reason of the fact that the statistical probability of a nuclear reaction between a neutron and the atoms of the nuclear reactant such as the boron atoms of boron trifluoride, for instance, is many thousand times greater in the case of slow neutrons than in the case of fast neutrons, the number of fast neutrons which will affect the counter tube 12 will represent only a few thousandths of one percent. However, the apparatus must be initially calibrated against carefully standardized samples since each neutron source will produce a neutron stream of unique intensity. Furthermore the counting of neutrons is statistical rather than absolute and therefore is measurable only in terms of ratios. Once the particular ratios and other constants for a given piece of apparatus have been established against absolute standards and the apparatus accordingly calibrated it is thereafter possible to interpret readings or recordings so as to obtain accurate and positive analytical results. It will of course be recognized that the methods and apparatus of the present invention are applicable to a wide range of analytical problems. However, there are certain types of analyses to which such apparatus and methods are uniquely well suited, such as for example, the analysis of soil samples in geophysical exploration.

In the course of exploring a particular section of the earth's surface to determine the character and type of petroleum deposits which may exist in the underlying strata it has become a recognized technique to take a multiplicity of soil samples at uniformly spaced selected points over the area in a sort of grid-work pattern. The samples are then analyzed to determine the presence of hydrocarbon materials for the reason that there is a direct relation between the quantity of hydrocarbon materials and the presence of petroleum products in the underlying strata. In fact it has been found that by taking a fairly large number of samples and plotting the relative quantities of hydrocarbons present in the various samples it is possible to delineate the boundary lines of subterranean oil deposits.

Although these principles and geophysical relationships have been established in practice, such geophysical surveys and explorations have been hampered by difficulties in available analytical methods and apparatus with which the soil samples can be analysed. The hydrocarbon content of any given sample is very minute and beyond the limits of accuracy or ordinary laboratory methods of chemical analysis. In addition to this the hydrocarbons which are present take the form of complex wax-like polymerization products, which are not readily susceptible to analysis by the usual acidimetric-alkilimetric or oxidation-reduction methods. Finally a survey of a relatively small section of territory will result in many hundreds of samples so as to require rather extensive analytical facilities if the samples must be analysed by usual routine methods. For this reason such geophysical exploration and surveys are extremely costly and relatively slow.

The methods and apparatus of the present invention however make it possible to run geophysical surveys of the type above described quickly and at comparatively small cost. Because of the rapidity and accuracy with which results may be obtained it is possible to send a survey crew into the field to take samples over an initial grid pattern in which the samples are widely spaced and thus "rough-in" the geophysical characteristics of the area. Thereupon the crew while still in the field can be directed to certain selected areas in which a finer grid-work pattern will be employed and a greater number of more closely spaced samples taken. In this secondary phase of the operation the speed and simplicity of the present methods and apparatus are highly important. Not only will the results of the survey be known almost as soon as the sampling crew is finished taking the samples but any striking deviations will show up. These deviations may result from actual geophysical idiosyncrasies in the area or may result from some error in sample taking. In either case it is possible to have new samples taken in such instance so that the results may be checked or corrected without the great expense of sending men back into the field many weeks after the original survey has been run.

Although the previously described use of the methods and apparatus of my present invention in the analysis of soil samples as an incident of geophysical exploration has been described above it should nevertheless be understood that such use is merely illustrative and that my invention is not limited strictly to the geophysical field but is applicable with equal speed and precision to practically any type of analytical situation where it is necessary to determine the amount of hydrogenous material present in a sample and various changes and modifications may be made where different types of hydrogenous materials or different operating conditions are encountered without departing from the spirit of my invention.

Having thus described my invention, what I claim and desire to secure by these Letters Patent is as follows:

1. The method of determining the amount of hydrogenous material in a selected sample which comprises completely drying the sample, interposing the dried sample in a path of fast neutrons, and measuring the reaction between fast neutrons and the hydrogenous material in the sample by imposing the slow neutrons resulting from such reaction upon a Geiger-Müller counter.

2. Analytical apparatus for the determination of the amount of hydrogenous material in a selected sample, comprising in combination a wax filled box having an internal chamber for receiving a sample to be analyzed, a lateral recess opening into the chamber, a source of fast neutrons within the recess, and means for counting the number of slow neutrons resulting from the reaction between the fast neutrons and the hydrogenous material.

3. Analytical apparatus for the determination of the amount of hydrogenous material in a selected sample, comprising in combination, a wax filled box provided with an outer layer formed of radiation-absorptive material and having an internal chamber for receiving a sample to be analyzed, a lateral recess opening into the chamber, a source of fast neutrons within the recess, and means for counting the number of slow neutrons resulting from the reaction between the fast neutrons and the hydrogenous material.

4. Analytical apparatus for the determination of the amount of hydrogenous material in a selected sample, comprising in combination, a wax filled box having a chamber for receiving a sample to be analyzed, a recess opening into the chamber, a source of fast neutrons within the recess, a channel extending outwardly from the opposite side of the chamber with respect to the recess, a compartment communicating with the channel, means in the compartment for converting into electrical impulses, the slow neutrons resulting from the reaction between the fast neutrons and the hydrogenous material, and means for recording said electrical impulses.

5. Analytical apparatus for the determination of the amount of hydrogenous material in a selected sample, comprising in combination, a wax filled box having a chamber for receiving a sample to be analyzed, a recess opening into the chamber, a source of fast neutrons within the recess, a channel extending outwardly from the opposite side of the chamber with respect to the recess, a compartment communicating with the channel, means in the compartment for converting into electrical impulses, the slow neutrons resulting from the reaction between the fast neutrons and the hydrogenous material, a high gain linear amplifier connected to said means for strengthening said impulses, a multi-vibrator connected to the amplifier for lengthening said impulses, and means connected to the multi-vibrator for recording said impulses.

6. Analytical apparatus for the determination of the amount of hydrogenous material in a selected sample, comprising in combination, a wax filled box having a chamber for receiving a sample to be analyzed, a recess opening into the chamber, a source of fast neutrons within the recess, a channel extending outwardly from the opposite side of the chamber with respect to the recess, a compartment communicating with the channel, means in the compartment for converting into electrical impulses, the slow neutrons resulting from the reaction between the fast neutrons and the hydrogenous material, a high gain linear amplifier connected to said means for strengthening said impulses, a multi-vibrator connected to the amplifier for lengthening said impulses, and an electro-mechanical recorder for recording said impulses.

7. Analytical apparatus for the determination of the amount of hydrogenous material in a selected sample, comprising in combination, a wax filled box having a chamber for receiving a sample to be analyzed, a recess opening into the chamber, a source of fast neutrons within the recess, a channel extending outwardly from the opposite side of the chamber with respect to the recess, a compartment communicating with the channel, means in the compartment for converting into electrical impulses, the slow neutrons resulting from the reaction between the fast neutrons and the hydrogenous material, a high gain linear amplifier connected to said means for strengthening said impulses, a multi-vibrator connected to the amplifier for lengthening said impulses, a pulse integrator connected to the multi-vibrator, and an instantaneous recorder connected to the pulse integrator for indicating said impulses.

LEONARD B. LIPSON.

REFERENCES CITED

The following references are of record in the file of this patent:

UNITED STATES PATENTS

| Number | Name | Date |
| --- | --- | --- |
| 2,220,509 | Brons | Nov. 5, 1940 |
| 2,269,889 | Blau | Jan. 13, 1942 |
| 2,316,239 | Hare | Apr. 13, 1943 |
| 2,316,329 | Hare | Apr. 13, 1943 |
| 2,323,128 | Hare | June 29, 1943 |
| 2,337,306 | Barnes | Dec. 21, 1943 |
| 2,370,163 | Hare | Feb. 27, 1945 |
| 2,378,219 | Hare | June 12, 1945 |